Patented Nov. 4, 1947

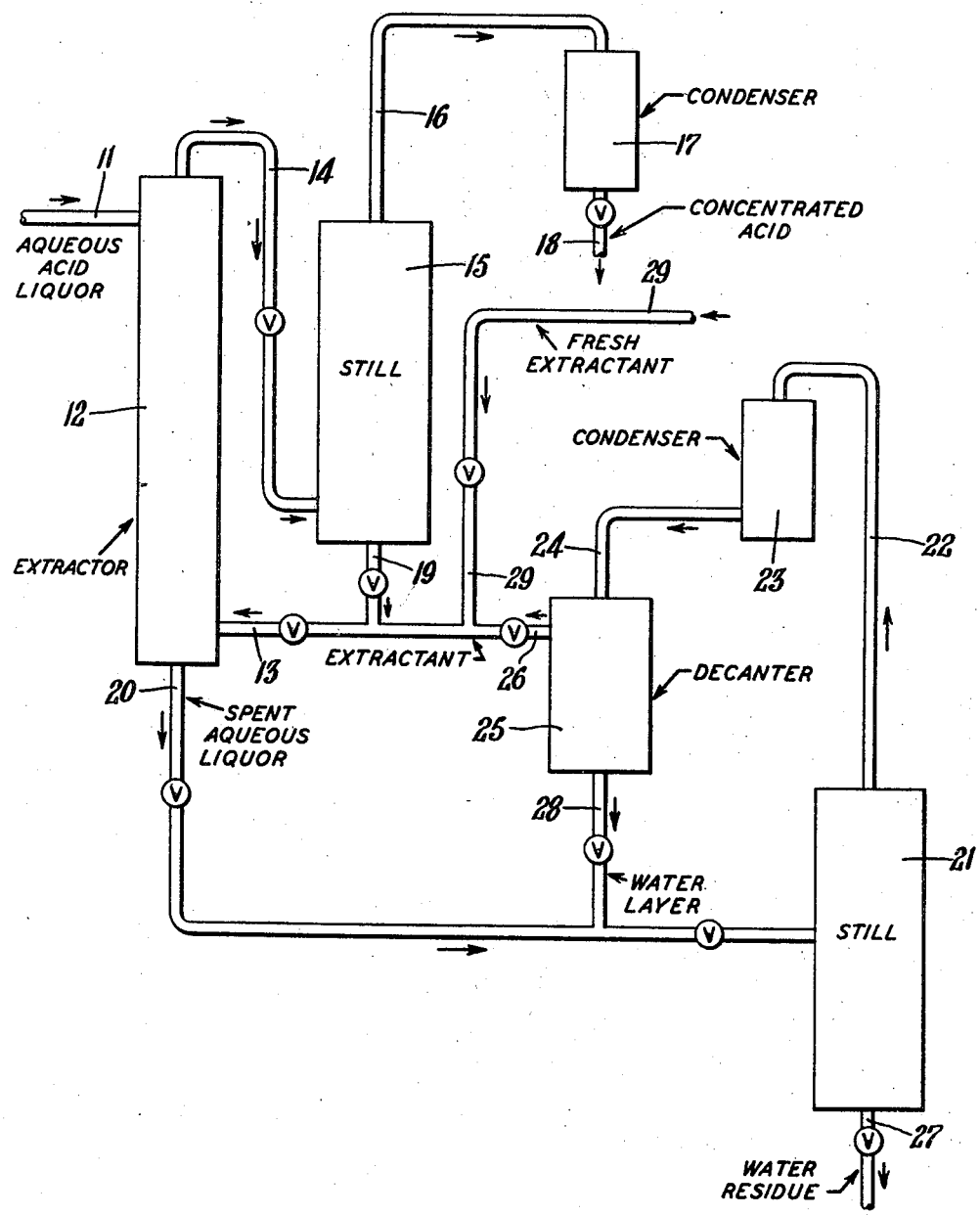

2,430,086

UNITED STATES PATENT OFFICE 2,430,086

EXTRACTANTS AND PROCESS FOR CONCENTRATING ORGANIC ACIDS

Charles E. Staff, Charleston, W. Va., assignor to Carbide and Carbon Chemicals Corporation, a corporation of New York Application July 2, 1942, Serial No. 449,392

2 Claims. (Cl. 260—541)

This invention relates to processes of concentrating aqueous lower aliphatic acids in which selective, water-immiscible solvents are employed as extractants.

It is known that aqueous acetic acid can be concentrated by extracting the aqueous acid with certain organic solvents, and recovering concentrated acid from the extract by distillation. Many solvents have been proposed for use in such processes. So far as I am aware, none of these has achieved the practical objective which is, of course, to extract economically and selectively all of the acid from the water and to produce an extract from which the acid and the solvent can economically be recovered. Some extraction processes have met with a degree of success, but so far as I am aware, they are all limited by the low selective extractive power of the solvent for the acid and by the necessity of processing a relatively large volume of extract. In some processes the extractant employed has a lower boiling point than the acetic acid and is recovered from the extract as a distillate which may also contain water. In other processes in which the extractant employed has a higher boiling point than the acetic acid, greater efficiency is possible because such processes do not require the distillation of the extractant. So far as I am aware, however, this latter type of process has suffered from the very low extractive power of the high boiling extractants thus far proposed and also from contamination of the acid by products of reactions involving the extractant which occur during the extraction and recovery operations.

I have now discovered that a solvent material which has a higher boiling point than the lower aliphatic acids and which comprises an aliphatic non-cyclic polyether substantially water-immiscible at elevated temperatures having in the molecule a carbon-to-oxygen atom ratio not greater than 6 to 1 or an aliphatic carboxylic acid having at least 5 carbon atoms in the molecule, is a very advantageous extractant for the concentration of aqueous solutions of acetic acid and other lower aliphatic acids. Mixtures of these solvent materials may also be used. The aliphatic polyethers are completely etherified alkyl ethers of polyhydric aliphatic alcohols. Straight chain or branched chain polyethers may be used, but cyclic polyethers are not contemplated by this invention. Of the higher carboxylic acids, those having not more than twelve carbon atoms in the molecule are preferred. These solvent materials make possible a greatly increased efficiency in acid concentration processes since they have relatively high selective extractive power for acetic and other lower aliphatic acids and they are especially valuable in concentrating aqueous acids of low initial concentrations.

At the same time the extractants of this invention are relatively stable and resistant to chemical reaction during use in the process. Because they contain no reactive alcoholic hydroxyl groups or hydrolyzable ester groups, there is no tendency toward the formation of reaction products under the conditions of the process. The higher aliphatic acid extractants have the additional advantage of being resistant to the chemical action of any mineral acids which may be present.

Extractants which I have found especially useful in carrying out the process of my invention are the dialkyl ethers of the glycols, including the diethers of the polyglycols, having the formula $R(OC_nH_{2n})_xOR'$ in which $n$ is an integer from 2 to 4, inclusive, and $x$ is an integer from 1 to 4, inclusive, represented by the diethers of the mono, di, tri and tetraglycols of ethylene glycol, propylene glycol, and butylene glycol. The etherifying radicals R and R' are such lower alkyl groups as methyl, ethyl, propyl, butyl and pentyl containing not more than five carbon atoms to the radical, including isomeric forms of these groups. The two etherifying radicals need not necessarily be the same but the ether molecule should contain at least six carbon atoms. Other extractant materials which may be used include the completely etherified derivatives of other polyhydric alcohols in which the etherifying groups have not more than five carbon atoms to the radical such as, for instance, the polyalkyl ethers of glycerol, diglycerol and the like. However, the dialkyl ethers of the glycols as set forth above are preferred.

The lower aliphatic acid may be recovered from the extract by distillation in efficient rectifying apparatus; the acid being obtained in the distillate, and the extractant as a still residue which may be returned directly to the extraction operations. By so choosing the extractant that there is a large difference between its boiling point and that of the acid distillate, it is possible to use less efficient rectification in the distillation step to attain good separation of the acid distillate. If extractable impurities are present in the aqueous acid, it may be necessary or desirable to purify the extractant obtained as a still residue, for example, by distillation, before it is recycled in the process.

Any small amount of the extractant which may be dissolved in the aqueous phase may be recovered by distillation or by any other convenient means. It is preferred to operate the extraction process under such conditions of temperature and pressure that the particular extractant used will exhibit its maximum selective extractive power and minimum solubility in the aqueous phase.

Auxiliary agents may be used with the extractants if desired, for the purpose of purifying or otherwise treating the aqueous lower aliphatic acid. For example, if mineral acids are present it may be desirable to employ a neutralizing agent.

The accompanying drawing diagrammatically illustrates the flow of materials in a system for the concentration of aqueous water-soluble lower aliphatic acids, according to this invention.

In the system shown, aqueous acid liquor is supplied through line 11 to the upper part of an extractor 12, and extractant is supplied through line 13 to the lower part of the extractor 12, in which a countercurrent flow of aqueous acid liquor and extractant occurs to enable the extractant to remove acid from the aquous liquor. The acid-enriched extractant leaves the extractor through line 14 and enters a still 15 in which acid-rich vapor is distilled from the liquid extract. The acid-rich vapor leaves the still 15 through a line 16 and a condenser 17. The condensed concentrated acid is withdrawn through line 18. The liquid extractant leaves the still 15 through the line 19 and the line 13, and re-enters the extractor 12. The spent (extracted) aqueous liquor leaves the extractor through line 20 and passes to a still 21 from which is recovered any dissolved extractant as its constant boiling mixture with water. This constant boiling mixture leaves the still 21 through a line 22 and a condenser 23, and the condensate of extractant and water enters a decanter 25 through line 24. The extractant and water layers from the decanter 25 are returned to the extractor 12 and still 21, respectively, through lines 26 and 28. The aqueous residue withdrawn from the still 21 by line 27 is substantially free of both the extractant and the lower aliphatic acid being concentrated in the process. Fresh extractant is introduced to the extractor 12 as needed through lines 29 and 13.

The extractive powers of several of the preferred solvent materials are given in the following tables. The extractive power is expressed as the distribution ratio; that is, the quotient of the concentration of the acid in the extractant layer divided by the concentration of the acid in the aqueous layer at equilibrium. The concentration of the acid in each layer was determined by mixing the extractant substance with an approximately equal volume of a 10% solution of the acid in water, heating this mixture to 85° C., agitating the mixture and allowing it to separate into layers while maintained at this temperature. The layers were then separated, and titrated with sodium hydroxide solution.

In these tables the Roman numerals refer to the following solvents, respectively:

I. Ethylene glycol diethyl ether
II. Diethylene glycol diethyl ether
III. Diethylene glycol methyl (normal) butyl ether
IV. Ethylene glycol methyl (normal) butyl ether
V. 2-ethyl butyric acid

Table A

[Distribution ratios at 85° C.]

| Acid in aqueous solution \ Solvent | I | II | III | IV | V |
|---|---|---|---|---|---|
| Formic | 0.51 | 0.89 | | | |
| Acetic | 0.70 | 1.00 | 1.00 | | 1.10 |
| Propionic | | 2.50 | | | |
| Butyric | | 5.45 | | | |
| Lactic | | 0.68 | | | |
| Pyruvic | | 1.48 | | | |
| Maleic | 0.40 | 0.63 | 0.50 | 0.27 | |
| Succinic | | | 0.74 | | |

Table B

[Distribution ratios at 30° C.]

| Acid in aqueous solution \ Solvent | I | III | IV | V |
|---|---|---|---|---|
| Acetic | 0.57 | 1.80 | 0.74 | 0.44 |
| Lactic | 0.35 | | | |

Comparable values for the distribution ratios of acetic acid at 30° C. between octyl alcohol (ethyl hexanol) and water and between dibutyl phthalate and water are about 0.55 and 0.10, respectively. These values were determined using aqueous solutions of acetic acid having an initial concentration of 5 percent of the acid.

The following tables give the solubilities in parts by weight of the preferred extractants in water, and of water in the extractants for selected temperatures:

Table C

[Solubility of the solvents in water as parts solvent per 100 parts water (by weight)]

| Temperature \ Solvent | I | II | III | IV | V |
|---|---|---|---|---|---|
| 20° C | 21.0 | | | | 2.2 |
| 22° C | | | | 3.8 | |
| 32° C | | | | | |
| 30° C | | 117.0 | 4.0 | | |
| 32° C | | | | | |
| 50° C | | 40.0 | | | |
| 85° C | | 15.0 | 1.2 | | |

Table D

[Solubility of water in the solvents as parts water per 100 parts solvent (by weight)]

| Temperature \ Solvent | I | II | III | IV | V |
|---|---|---|---|---|---|
| 20° C | 3.4 | | | | 3.3 |
| 22° C | | | | 3.0 | |
| 32° C | | | | | |
| 30° C | | | 9.5 | | |
| 32° C | | | | | |
| 50° C | | 10.0 | | | |
| 85° C | | | 6.6 | | |

The process of this invention may be carried out in a standard apparatus for carrying out extractions, with appropriate auxiliary stills and separatory vessels, and at elevated temperature.

Depending upon the design of the extractor and the rates of feeding the extractant and the dilute acid liquor, the aqueous phase may be substantially freed of acid. By way of illustration, diethylene glycol methyl normal butyl ether is introduced through a dispersing nozzle at the bottom of a long, upright, packed extraction column; and the dilute aqueous acetic acid (approximately 5%, acetic acid) is introduced at the top of the extractor through a dispersing nozzle. The aqueous phase descends and the extractant phase ascends to effect intimate mixing of the two liquids. From the top of the extractor the extract, containing the extractant, acetic acid and some water, is conducted to a still, from which the relatively concentrated acid is distilled. The extractant remains as a still residue and is removed from the bottom of the still and recycled to the extractor. The aqueous phase containing some dissolved extractant is removed from the bottom of the extractor and conducted to a still, by means of which the extractant is recovered as an azeotropic mixture. The condensate from this still is separated into an extractant layer and a water layer by means of a decanter, and the extractant layer is recycled to the extractor while the water layer is returned to the still. Fresh extractant is added, as needed, to the recycled and recovered extractant.

As will be apparent from the foregoing, the present invention may be practiced with any of the above types of extractant solvents and with procedures other than those specifically described and under a variety of conditions of temperatures, pressures, or concentrations of materials. Such modifications are part of this invention and are intended to be included therein.

I claim:

1. Process of concentrating an aqueous water-soluble lower aliphatic acid which comprises extracting the acid with a liquid extractant and recovering the lower aliphatic acid from the extract; said extractant having a higher boiling point than said lower aliphatic acid and comprising as an essential ingredient thereof an aliphatic carboxylic acid having from 5 to 12 carbon atoms in the molecule.

2. Process of concentrating an aqueous water-soluble lower aliphatic acid which comprises extracting the acid with a liquid extractant and recovering the lower aliphatic acid from the extract; said extractant having a higher boiling point than said lower aliphatic acid and comprising as an essential ingredient thereof an ethyl butyric acid.

CHARLES E. STAFF.

REFERENCES CITED

The following references are of record in the file of this patent:

UNITED STATES PATENTS

| Number | Name | Date |
| --- | --- | --- |
| 2,145,802 | Ralston et al. | Jan. 31, 1939 |
| 2,107,527 | Evans et al. | Feb. 8, 1938 |
| 2,164,007 | Evans et al. | June 27, 1939 |
| 2,273,785 | Larson | Feb. 17, 1942 |
| 1,968,033 | Evans et al. | July 31, 1934 |
| 2,067,385 | Evans et al. | Jan. 12, 1937 |
| 2,197,467 | Evans et al. | Apr. 16, 1940 |
| 1,915,002 | Ricard et al. | June 20, 1933 |
| 2,275,862 | Othmer | Mar. 10, 1942 |
| 2,199,983 | Bright | May 7, 1940 |
| 2,157,143 | Othmer | May 9, 1939 |

OTHER REFERENCES

Hommelen, Chem. Absts., vol. 27, p. 5306 (1933).